US009717139B1

(12) United States Patent
Wiederin

(10) Patent No.: US 9,717,139 B1
(45) Date of Patent: Jul. 25, 2017

(54) TORCH COOLING DEVICE

(71) Applicant: Elemental Scientific, Inc., Omaha, NE (US)

(72) Inventor: Daniel R. Wiederin, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 141 days.

(21) Appl. No.: 14/469,213

(22) Filed: Aug. 26, 2014

Related U.S. Application Data

(60) Provisional application No. 61/869,779, filed on Aug. 26, 2013.

(51) Int. Cl.
*B23K 10/00* (2006.01)
*H05H 1/28* (2006.01)
*H05H 1/30* (2006.01)

(52) U.S. Cl.
CPC ................ *H05H 1/28* (2013.01); *H05H 1/30* (2013.01)

(58) Field of Classification Search
CPC .. H05H 1/30; H05H 1/28; H05H 1/26; H05H 1/34
USPC .............. 219/121.48, 121.5, 121.49, 121.51; 315/111.51
See application file for complete search history.

(56) References Cited

U.S. PATENT DOCUMENTS 5,560,844 A * 10/1996 Boulos .................... H05H 1/28 219/121.49
6,054,913 A * 4/2000 Leuer ...................... G21B 1/21 335/216
6,410,880 B1 * 6/2002 Putvinski ................ H05H 1/42 219/121.48
8,633,416 B2 * 1/2014 Morrisroe ................ H05H 1/30 219/121.44
2006/0190511 A1 * 8/2006 Corum ..................... G05F 3/04 708/200
2008/0188013 A1 * 8/2008 Cho ........................ C23C 16/52 438/7
2012/0261390 A1 * 10/2012 Boulos .................... H05H 1/30 219/121.49
2015/0334815 A1 * 11/2015 Hong ....................... H05H 1/28 219/121.49

* cited by examiner

*Primary Examiner* — Mark Paschall
(74) *Attorney, Agent, or Firm* — Advent, LLP

(57) ABSTRACT

In one or more implementations, an inductively coupled plasma torch cooling device that employs example techniques in accordance with the present disclosure includes an annular chamber configured to allow a flow of coolant to pass through the annular chamber, an inlet port, and an outlet port.

18 Claims, 2 Drawing Sheets

TORCH COOLING DEVICE

CROSS-REFERENCE TO RELATED APPLICATIONS

The present application claims the benefit under 35 U.S.C. §119(e) of U.S. Provisional Application Ser. No. 61/869,779, filed Aug. 26, 2013, and titled "TORCH COOLING DEVICE," which is herein incorporated by reference in its entirety.

BACKGROUND

An inductively coupled plasma (ICP) is a type of plasma source in which the energy is supplied by electric currents which are produced by electromagnetic induction and by time-varying magnetic fields. An inductively coupled plasma can be used for sample chemical analysis, such as in atomic emission spectroscopy (ICP-AES), mass spectrometry (ICP-MS), and reactive-ion etching (ICP-RIE).

SUMMARY

In one or more implementations, an inductively coupled plasma torch cooling device that employs example techniques in accordance with the present disclosure includes a device with an annular chamber configured to allow a flow of coolant to pass through the annular chamber, an inlet port, and an outlet port. The inductively coupled plasma torch cooling device includes an inner wall, an outer wall, and multiple side walls.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Figure 1:
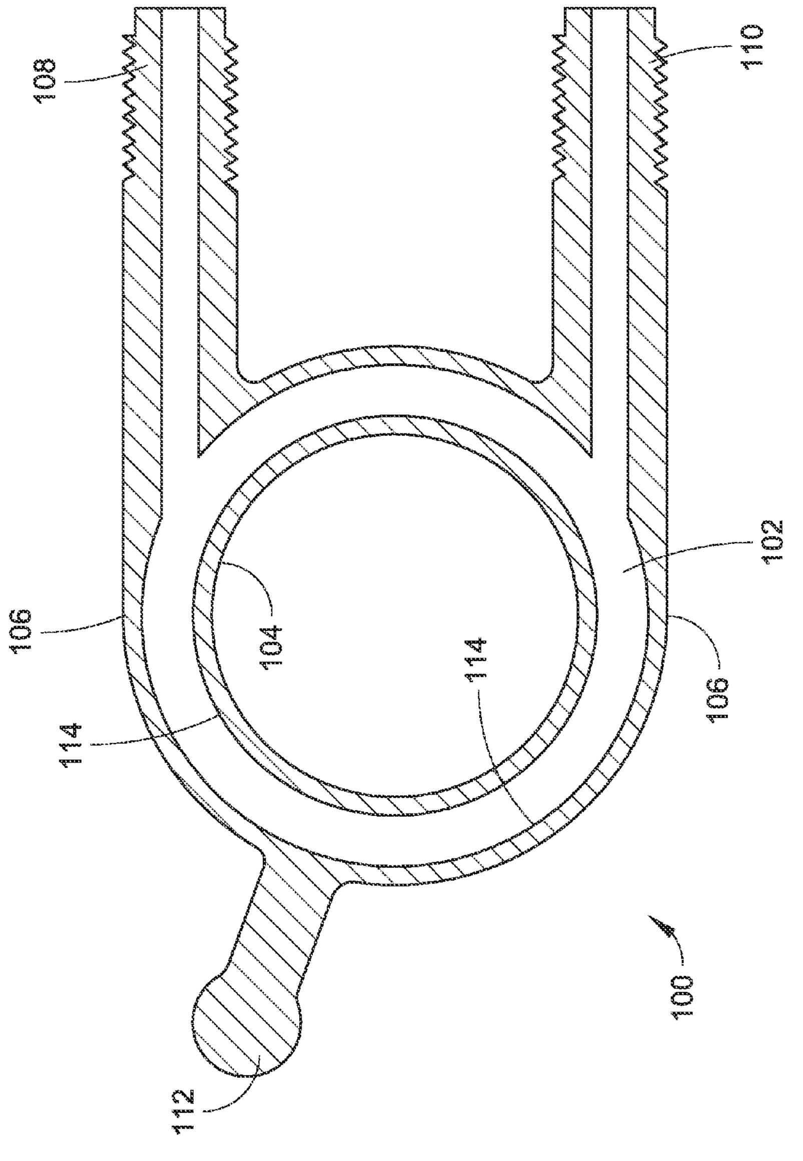
FIG. 1 is a diagrammatic cross-sectional illustration of an inductively coupled plasma torch cooling device, where the inductively coupled plasma torch cooling device is configured to be disposed external of a torch in accordance with example embodiments of the present disclosure.
Figure 2:
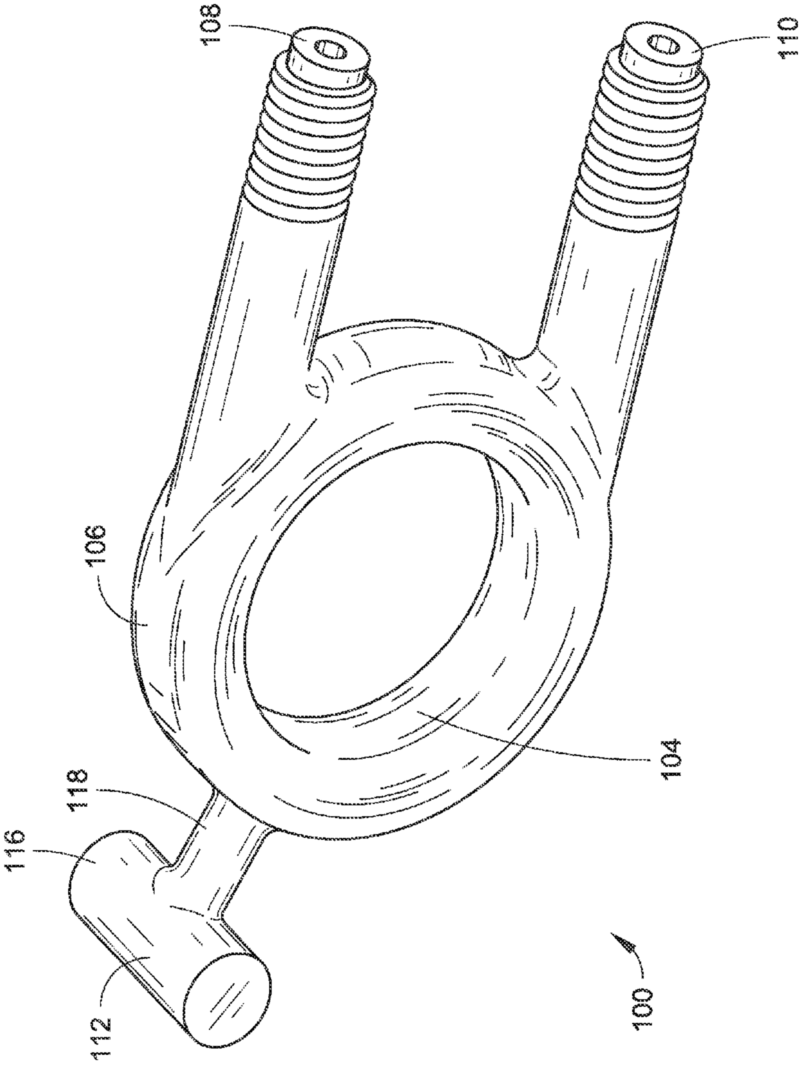
FIG. 2 is an isometric illustration of an inductively coupled plasma torch cooling device, where the inductively coupled plasma torch cooling device is configured to be disposed external of a torch in accordance with example embodiments of the present disclosure.

Referring generally to FIGS. 1 and 2, an inductively coupled plasma torch cooling device 100 for cooling a plasma torch is described. The inductively coupled plasma torch cooling device 100 includes an annular chamber 102 configured for allowing a flow of coolant to pass through the annular chamber 102. The inductively coupled plasma torch cooling device 100 also includes an inner wall 104, an outer wall 106, at least one side wall 114, an inlet port 108, and an outlet port 110.

As shown in FIG. 1, the annular chamber 102 is configured to allow a coolant flow (e.g., a cooling gas such as air or argon, a cooling liquid such as water, and so forth) through the main body of the inductively coupled plasma torch cooling device 100. In an embodiment, a cooling gas including air is pumped through the inductively coupled plasma torch cooling device 100. In this embodiment, the cooling gas enters the inductively coupled plasma torch cooling device 100 through the inlet port 108 and exits the inductively coupled plasma torch cooling device 100 through the outlet port 110. The inlet port 108 and/or the outlet port 110 may be coupled to the annular chamber 102 such that coolant can flow into the inlet port 108, through the annular chamber 102, and out of the outlet port 110. In implementations, the inductively coupled plasma torch cooling device 100 is formed of a quartz material. However, quartz is provided by way of example only and is not meant to limit the present disclosure. In other embodiments, the inductively coupled plasma torch cooling device 100 can be formed using one or more other materials.

FIG. 2 illustrates an isometric view of the inductively coupled plasma torch cooling device 100. In some embodiments, the annular chamber 102 may be continuous around and through the body of the inductively coupled plasma torch cooling device 100. In other embodiments, the annular chamber 102 is not continuous between the inlet port 108 and the outlet port 110 (e.g., one or more solid partitions may be formed in the annular chamber 102 to block coolant flow).

In a specific embodiment, the inductively coupled plasma torch cooling device 100 has an inner wall 104 with an inside diameter of at least approximately twenty millimeters (20 mm) (e.g., large enough that a standard twenty millimeter (20 mm) diameter torch can pass through the inductively coupled plasma torch cooling device 100), an outer wall 106 with an outside diameter of at least approximately thirty millimeters (30 mm), and side walls 114 that are spaced apart at least approximately eight and one-half millimeters (8.5 mm) between the inner wall 104 and the outer wall 106. In some embodiments, the walls 104 and 106, and 114 comprise the exterior and interior surfaces, respectively, of generally tubular quartz material that is at least approximately one millimeter (1 mm) thick.

In some embodiments, the inductively coupled plasma torch cooling device 100 includes a handle 112 coupled to the main body of the inductively coupled plasma torch cooling device 100, where the handle 112 is configured for ease of handling. In some embodiments, the handle 112 can comprise an elongated cylindrical member 116 connected perpendicularly to a support member 118 that extends in a generally radial direction from the outer wall 106 (e.g., with respect to the center of the inductively coupled plasma torch cooling device 100). In some embodiments, the inductively coupled plasma torch cooling device 100 can be positioned around an ICP torch (i.e., so that the torch passes through the inductively coupled plasma torch cooling device 100) and coupled to an inlet coolant line and/or an outlet coolant line. As the torch is operating, plasma temperatures can range between six thousand Kelvin (6,000 K) and ten thousand Kelvin (10,000 K). The inductively coupled plasma torch cooling device 100 can function as a cooling device for the torch. The inductively coupled plasma torch cooling device 100 can also be removed, replaced, repositioned, and so forth due to its configuration as an external and removable device.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A device for cooling a plasma torch, comprising:

an inductively coupled plasma torch cooling device configured to be positioned around an inductively coupled plasma torch, where the inductively coupled plasma torch passes through the inductively coupled plasma torch cooling device, the inductively coupled plasma torch cooling device comprising an annular chamber configured to allow a flow of coolant to pass through the annular chamber, the annular chamber having an inner wall and an outer wall in a concentric configuration, and at least one side wall, the annular chamber formed of a tubular quartz material;

an inlet port fluidically coupled to the side wall of the annular chamber; and an outlet port fluidically coupled to the side wall of the annular chamber, the inductively coupled plasma torch cooling device configured to be disposed external to a plasma torch and to be removable.

2. The inductively coupled plasma torch cooling device as recited in claim 1, wherein the annular chamber is at least approximately one millimeter (1 mm) thick.

3. The inductively coupled plasma torch cooling device as recited in claim 1, wherein the inner wall comprises an inside diameter of at least approximately twenty millimeters (20 mm).

4. The inductively coupled plasma torch cooling device as recited in claim 1, wherein the outer wall comprises an outside diameter of at least approximately thirty millimeters (30 mm).

5. The inductively coupled plasma torch cooling device as recited in claim 1, wherein the side wall is spaced apart at least approximately eight and one-half millimeters (8.5 mm) between the inner wall and the outer wall.

6. The inductively coupled plasma torch cooling device as recited in claim 1, further comprising a handle connected to the outer wall.

7. The inductively coupled plasma torch cooling device as recited in claim 6, wherein the handle comprises an elongated cylindrical member connected perpendicularly to a support member that extends in a generally radial direction from the outer wall.

8. A device for cooling a plasma torch, comprising:

an inductively coupled plasma torch cooling device configured to be positioned around an inductively coupled plasma torch, where the inductively coupled plasma torch passes through the inductively coupled plasma torch cooling device, the inductively coupled plasma torch cooling device comprising an annular chamber configured to allow a flow of coolant to pass through the annular chamber, the annular chamber having an inner wall and an outer wall in a concentric configuration, and at least one side wall, the annular chamber formed of a tubular quartz material;

an inlet port fluidically coupled to the side wall of the annular chamber;

an outlet port fluidically coupled to the side wall of the annular chamber, the inductively coupled plasma torch cooling device configured to be disposed external to a plasma torch and to be removable; and a handle connected to the outer wall.

9. The inductively coupled plasma torch cooling device as recited in claim 8, wherein the annular chamber is at least approximately one millimeter (1 mm) thick.

10. The inductively coupled plasma torch cooling device as recited in claim 8, wherein the inner wall comprises an inside diameter of at least approximately twenty millimeters (20 mm).

11. The inductively coupled plasma torch cooling device as recited in claim 8, wherein the outer wall comprises an outside diameter of at least approximately thirty millimeters (30 mm).

12. The inductively coupled plasma torch cooling device as recited in claim 8, wherein the side wall is spaced apart at least approximately eight and one-half millimeters (8.5 mm) between the inner wall and the outer wall.

13. The inductively coupled plasma torch cooling device as recited in claim 8, wherein the handle comprises an elongated cylindrical member connected perpendicularly to a support member that extends in a generally radial direction from the outer wall.

14. A device for cooling a plasma torch, comprising:

an inductively coupled plasma torch cooling device configured to be positioned around an inductively coupled plasma torch, where the inductively coupled plasma torch passes through the inductively coupled plasma torch cooling device, the inductively coupled plasma torch cooling device comprising an annular chamber configured to allow a flow of coolant to pass through the annular chamber, the annular chamber having an inner wall and an outer wall in a concentric configuration, and at least one side wall, the at least one side wall spaced apart at least approximately eight and one-half millimeters (8.5 mm) between the inner wall and the outer wall, the annular chamber formed of a tubular quartz material;

an inlet port fluidically coupled to the side wall of the annular chamber; and an outlet port fluidically coupled to the side wall of the annular chamber, the inductively coupled plasma torch cooling device configured to be disposed external to a plasma torch and to be removable.

15. The inductively coupled plasma torch cooling device as recited in claim 14, wherein the inner wall comprises an inside diameter of at least approximately twenty millimeters (20 mm).

16. The inductively coupled plasma torch cooling device as recited in claim 14, wherein the outer wall comprises an outside diameter of at least approximately thirty millimeters (30 mm).

17. The inductively coupled plasma torch cooling device as recited in claim 14, further comprising a handle connected to the outer wall.

18. The inductively coupled plasma torch cooling device as recited in claim 17, wherein the handle comprises an elongated cylindrical member connected perpendicularly to a support member that extends in a generally radial direction from the outer wall.

* * * * *